Jan. 11, 1966 F. M. SHONKWILER 3,228,178
SENSOR FINGER MOUNTING ON ROCKABLE COMBINE TABLES
Filed April 22, 1964 3 Sheets-Sheet 1

INVENTOR
FOREST M. SHONKWILER
BY Herbert A. Weinturn
ATTORNEY

Jan. 11, 1966     F. M. SHONKWILER     3,228,178
SENSOR FINGER MOUNTING ON ROCKABLE COMBINE TABLES
Filed April 22, 1964     3 Sheets-Sheet 2
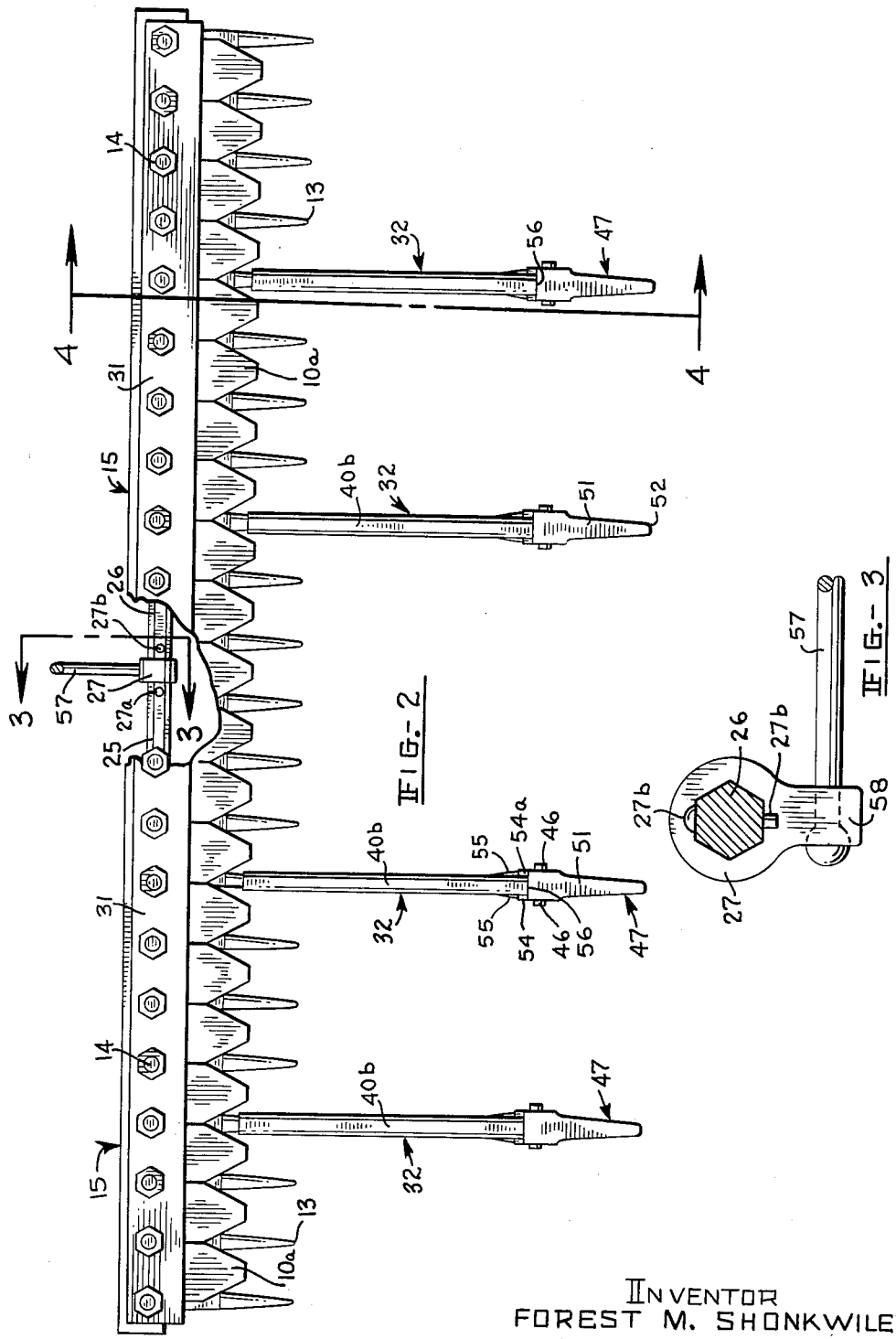
INVENTOR
FOREST M. SHONKWILER
BY Herbert Q. Weinstein
ATTORNEY

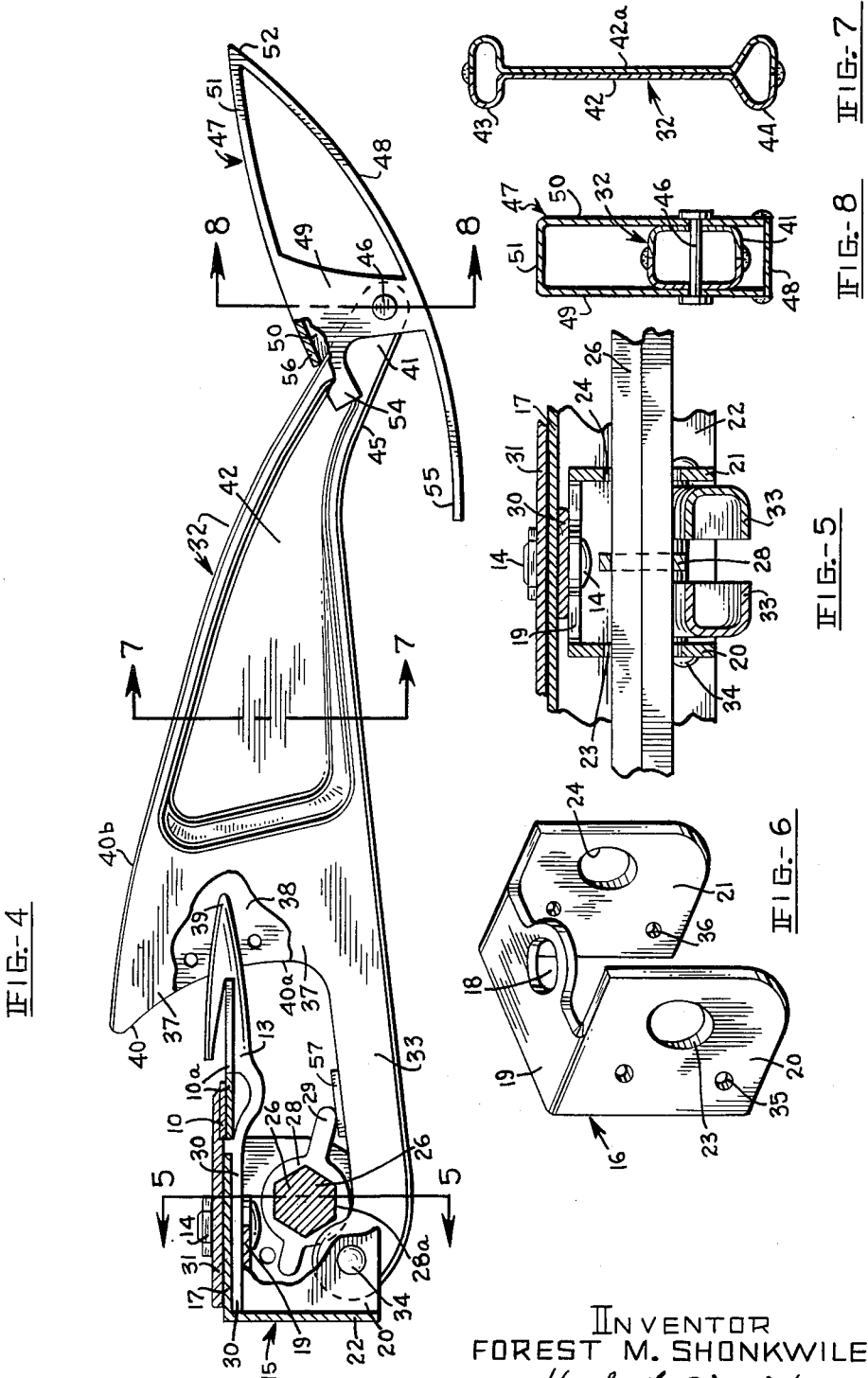

United States Patent Office 3,228,178
Patented Jan. 11, 1966

3,228,178
SENSOR FINGER MOUNTING ON ROCKABLE
COMBINE TABLES
Forest M. Shonkwiler, 18580 Roosevelt Blvd.,
South Bend, Ind.
Filed Apr. 22, 1964, Ser. No. 361,808
5 Claims. (Cl. 56—214)

This invention relates to the mounting of a sensing structure in conjunction with control means for maintaining a predetermined clearance of a sickle bar of a combine or the like above irregularities of ground surface as the combine may travel thereover.

Reference is made to my copending application for U.S. Letters Patent Serial No. 94,187, filed March 8, 1961, and allowed January 7, 1964, now Patent No. 3,137,984.

Attempts have been made to provide a mechanism which would automatically maintain the cutter bar carried along the forward side of a grain table or platform of a combine so as to maintain the sickle bar at a uniformly fixed distance above the ground, regardless of the contour of the ground, presence of clods or stones, and ridges or the like produced or set up in the cultivation of the crops.

One such mechanism is that described in the above indicated pending application has been quite successful, and the present invention is confined to a structure which relates to the mounting of a sensing structure in conjunction with control means for maintaining a predetermined clearance of the sickle bar above the ground surface irregularities as above indicated.

It is the primary object of the present invention to provide a structure having long life under the severe conditions encountered, such as sand and mud getting into bearings of moving elements. A further primary object of the invention is to provide a simple structure to be more readily attached and detached from the combine and to be of light weight in order to reduce the power required to operate the structure.

Furthermore the present invention provides for a smooth action of the various parts under adverse conditions as well as favorable conditions.

These and other objects and advantages of the invention will become apparent to those versed in the art in the following description of the invention as illustrated in the accompanying drawings, in which FIG. 1 is a view in side elevation of the forward end of a combine to which the invention is applied;

FIG. 2 is a view on an enlarged scale in top plan of the sickle bar carrier to which the invention is applied;

FIG. 3 is a transverse section on the line 3—3 in FIG. 2;

FIG. 4 is a transverse section on an enlarged scale on line 4—4 in FIG. 2;

FIG. 5 is a longitudinal section on the line 5—5 in FIG. 4;

FIG. 6 is a view in front perspective, on an enlarged scale, of a mounting bracket;

FIG. 7 is a transverse view on the line 7—7 in FIG. 4; and

FIG. 8 is a transverse view on the line 8—8 in FIG. 4.

Figure 1:
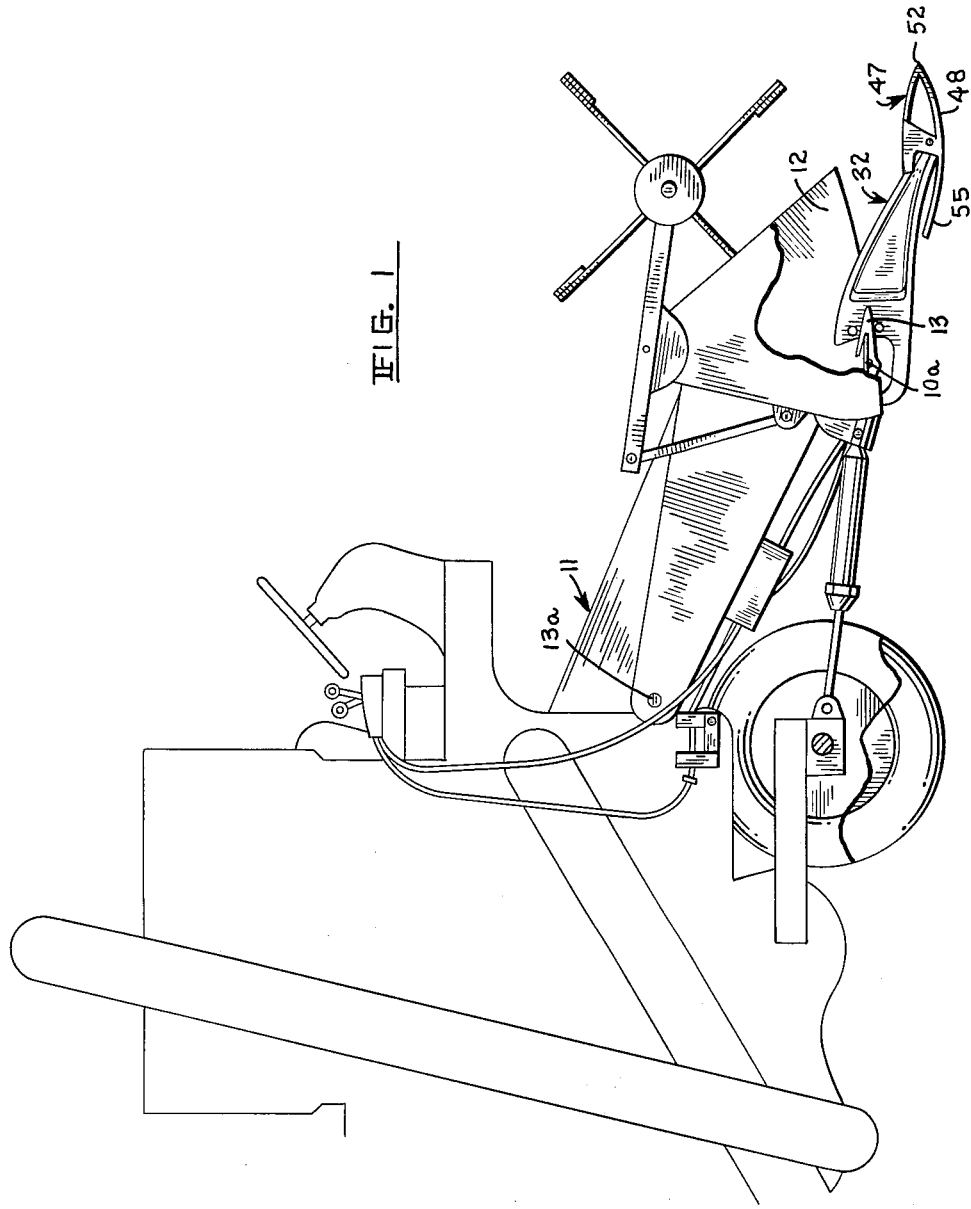

As indicated in FIG. 1, a sickle bar 10 is mounted across the front end of a combine generally designated by the numeral 11. The forward end 12 of the combine 11 is adjustable vertically by rocking about a pivot 13a all in the usual and well known manner.

Referring to FIG. 2 and also FIG. 4, the sickle bar 10 with sections 10a thereon is horizontally slidable along a plurality of guards 13 bolted by means of the bolts 14 to an angle bar 15.

A number of brackets generally designated by the numeral 16 are secured to the underside of the forwardly disposed leg 17 of the angle bar 15. These brackets 16 are held in place by a bolt 14 in each instance passing vertically through a hole 18, preferably with the head of the bolt 14 under the cross member 19 of the bracket 16. This bracket 16 has a leg 20 turned downwardly from one side and a leg 21 turned downwardly on the other side. The rear ends of these legs are in abutment with the downturned angle bar leg 22. The only connection between the legs 20 and 21 is the top uniting cross member 19 from which the legs 20 and 21 are turned downwardly at right angles so as to bring the two legs into parallelism. Also as indicated, the width of the cross member 19 is less than the width of the legs 20 and 21. Each of the legs 20 and 21 has a hole 23 and 24 respectively therethrough aligned on an axis parallel with the top cross member 19.

Where the sickle bar 10 is of considerable length such as up to ten to twelve feet or more, two shafts 25 and 26 are passed through the holes 23 and 24 of the brackets carried against the angle bar 15.

In the present illustration of the invention, there are four brackets 16 employed and these shafts 25 and 26 are brought together end to end within a sleeve 27, and is held on the respective shafts 25 and 26 by pins 27a and 27b one on each side of the sleeve 27, FIG. 2, so that the sleeve may not slide axially along the shaft.

These shafts have a polygonal cross-section shape, and in the present showing, the shape constitutes in outline a hexagon, FIG. 4. These shafts 25 and 26 are rotatably carried by the brackets 16 by passing through the circular holes 23 and 24, on the margins of which, the shafts ride by their outer corners. Of course a suitable bushing may be employed, not shown, to fit the hole and to conform to the shape of the shafts although this has not been found to be necessary.

Between the legs 20 and 21 of each bracket 16, there is a rocker member 28 slidably carried along the respective shafts 25 and 26. This rocker member 28 has a hole 28a therethrough, with its margin hexagonal in shape, so that the member 28 is turned with the rotation of the shafts 25 and 26 as indicated, for example on the one shaft 26 in FIG. 4. This rocker member 28 has a finger 29 extending radially of the shaft.

The guard 13 in each instance has a rear end length 30 which retains the guard 13 in fixed position by the bolt 14 passing upwardly through the guard rear end 30. A sickle retainer bar 31 lies over the top angle leg 17, and extends forwardly to confine the sickle bar 10 by a forward marginal portion in longitudinal sliding relation over the ledger plate 10a. The bracket cross member 19 in each instance bears directly against the underside of the guard end 30 FIG. 5. A finger generally designated by the numeral 32 has a rear end portion 33 which is bifurcated as indicated in FIG. 5, and the two sides of that rear end 33 are rockably supported by the bracket legs 20 and 21 by means of a pin 34 passing through holes 35 and 36 in the respective bracket legs 20 and 21, these holes 35 and 36 being located below and behind the holes 23 and 24, FIG. 6.

The finger 32 is free to rock up and down on the pin 34 within limits. The finger 32 in the present form is made out of formed steel, although not necessarily so, but preferably in order to provide a relatively light weight finger together with sufficient strength.

Forwardly of the bifurcated end 33, the finger 32 rises by spaced apart sides 37 and 38 and these sides 37 and 38 extend rearwardly of the front end 39 of the guards, so that the portion of the guard 13 which is beyond the sickle bar 10, FIG. 4, may be within the space between those side walls of the finger 32. These walls 37 and 38 have rear edges curving around in an arcuate manner following the lines 40 and 40a, whereby regardless of the downward travel of the finger 32, the guard end 39 will be between the sides 37 and 38 and at all times the margins 40 and 40a will be spaced somewhat ahead of the sickle 10.

These two sides 37 and 38 are joined together across their upper edges by the transverse member 40b which in fact is an integral part of the sides. The finger 32 extends forwardly a distance for approximately eighteen inches to a forward end 41. Intermediate the sides 37 and 38, the finger 32 is provided with a central panel 42 on the one side and 42a on the other side and the top and bottom portions of the finger 32 above and below these panels maintains substantially the normal width portions 43 and 44, FIG. 7.

The front end 41 consists of a portion 45 which is downwardly and forwardly directed. Through the end of this portion 45 extends a pin 46 on which is rockably carried a shoe 47. This shoe 47 has an under arcuate runner 48 from which extend upwardly the side legs 49 and 50 and through which extends the pin 46, FIG. 8. The upper ends of the legs 49 and 50 are tied together by a strap 51 which is continued forwardly and around to the forward end 52 of the runner 48, FIG. 4. Normally tihs shoe 47 will be balanced so that the immediate part of the runner 48 will have its central zone below the pin 46 approximately horizontally disposed, and under the curvature of the runner 48 would position the front end 52 above that horizontal zone.

In any event, the side legs 49 and 50 in each instance carry an ear 54 and 54a respectively between which the top strap 51 terminates at a zone 56 to limit the upward travel of the point 52 by that zone end of the shoe 47 striking the topside of the finger 32. Downward swing of the point 52 is limited by the tail end 55 of the runner 48 striking the underside of the finger 32.

Referring to FIG. 3, the shafts 25 and 26 may be rocked by a control rod 57 interengaging a normally downturned arm 58 which is an integral part of the sleeve 27. The control means not herein shown and not forming a part of this invention per se but being disclosed in the above indicated patent application, is operated by rotation of the shafts 25 and 26 upon the runner 48 coming into contact with some obstruction on the ground, the shaft 25 and 26 being rotated by reason of the finger 29 normally in the path of an anvil 57, FIG. 4 which is fixed across the topsides of the end portions 33. This upward pressure transmitted from the runner 48 through the finger 32 to the finger 29 is reflected through the rod 57 which leads to the controlling apparatus (not shown). In any event, this relieves the pressure of the finger 29 on the anvil 57 to permit the runner 48 to slide freely over the obstacle, while the control lifts the grain table or platform to give the required clearance of the sickle over the obstacle. When the finger 32 is lifted as just described, the other fingers 32 out of contact with the obstruction or a plant row ridge, are free to drop since there is then no pressure by the fingers 29 on the anvils 57 of these other fingers.

Attention is directed to the fact that by locating the pivot pin 34 to the rear of and below the axis of the shaft 25 or 26 as the case may be, FIG. 4, as the finger 32 may be rocked upwardly, the anvil 57 will travel relatively under the finger 29 to give a slightly, gradually increasing leverage on the finger 29 which is of great advantage in operating the control mechanism. Likewise the finger 29 will exert a decreasing pressure on the anvil 57 when the finger 32 is being lowered, although the finger 32 would normally drop by gravity in each instance.

Therefore it is to be seen that I have provided an improved sensing finger operation, providing sliding action of the finger 29 of the rocker 28 over the anvil 57 due to the rocker 28 fitting the contour of the shaft in each instance. The runner 48 will be in contact with the ground surface, at least by its tail portion 55, in riding over an obstruction, and will supply the necessary upturning of the finger 29 to actuate the platform lifting mechanism.

While I have herein shown my invention in the form now best known to me, obviously changes may be employed in the structure particularly in the shapes and materials employed in making the finger 32 and in providing the shoe 47 with a runner 48 out of a wear resistant material, since this runner is subject to abrasive action in its travel over the ground. When the runner 48 does become worn, the shoe 47 may be readily replaced by removing the pin 46, applying the new shoe and replacing the pin. It is also obvious that such changes suggested may be made without departing from the spirit of the invention, and I therefore do not desire to be limited to this precise form beyond the limitations which may be imposed by the following claims.

I claim:

1. A device sensing presence of obstructions ahead of a machine traversing ground and having a forward end requiring lifting to pass over such obstructions, comprising brackets fixed to the machine at said front end;
   a shaft rotatably carried by said brackets along said front end;
   lift fingers extending forwardly of the machine, one carried by each of said brackets on pivots on the brackets offset from the axis of said shaft;
   a finger rotatively fixed to said shaft at each of said brackets and extending into the path of a rear portion of each of said lift fingers; and
   a machine front end lift control lever rotatively fixed to said shaft rocking in response to up travel of at least one of said fingers upon encountering a ground obstacle.

2. The structure of claim 1, in which
   said pivots are located below and rearwardly of the axis of said shaft; and
   said fingers are freely rotative on said pivots.

3. A sensing device in combination with a harvesting machine having a sickle bar, fixed guards extending ahead of the sickle bar, a structural bar carrying said guards and means lifting and lowering said sickle bar, said device comprising a plurality of brackets adjacent to said sickle bar and carried by said structural bar below and to the rear of said guards;
   a shaft rotatively carried by said brackets, approximately parallel to, below and behind said sickle bar;
   said shaft having a polygonal cross-section;
   a rocker member carried by and slidable longitudinally of said shaft at selected ones of said brackets;
   said rocker member having a hole therethrough, the periphery of said hole conforming to the shape of said shaft to cause said shaft to rotate upon rotating said member;
   pivot means carried by said selected brackets located below and behind the rotative axis of said shaft;
   a sensing finger carried by a rear end by said pivot means;
   said sensing finger extending forwardly from the pivot means by a free end at a distance beyond said guards, the finger normally swinging downwardly by its forward end;
   a finger extending from said rocker member, forwardly above and in the path of a portion of said sensing finger to make contact with said portion upon rocking of the sensing finger; and
   said contact shifting along said portion upon upward and downward rocking of the sensing finger thereby shifting the leverage length of said sensing finger from its pivot to said rocker member finger contact, upon said sensing finger rocking; and
   said shaft being rocked by said sensing finger forward end rising and lifting said rocker member finger; and lever means carried by said shaft, the travel of which operates said sickle bar lifting and lowering means.

4. The structure of claim 2, in which
said brackets each comprises an inverted U-shaped member having an upper cross piece, from the respective ends of which is a downturned leg;
said pivot comprising a pin extending through and between said legs; and
said shaft extending through said legs.

5. The combination of
a sickle bar;
a structure bar carrying said sickle bar;
a plurality of brackets fixed in spaced relation along said structure bar, below said sickle bar;
each of said brackets being a pair of spaced apart legs;
a shaft extending longitudinally of said sickle bar and rotatably carried by said legs;
a ground contour sensing finger vertically rockably carried by at least one of said brackets on a pivot carried across said legs;
said pivot being located below and rearwardly of the longitudinal axis of said shaft;
said finger extending forwardly of said sickle bar and normally dropping downwardly by a forward end;
means limiting the degree of said finger dropping;
a rocker member fitting about and slidable longitudinal of said shaft;
means on said shaft engaging and holding said rocker member against revolution around the shaft;
a shaft rotating finger extending forwardly above a rear portion of and near the sensing finger to be in the path of the sensing finger upon upwardly rocking thereof; and
said rocker member being carried by said shaft between said bracket legs thereby limiting longitudinal travel of the member.

References Cited by the Examiner
UNITED STATES PATENTS

| | | | |
|---|---|---|---|
| 2,014,569 | 9/1935 | Huddle | 56—313 |
| 2,589,553 | 3/1952 | Kesselring | 56—257 |
| 2,746,230 | 5/1956 | Reimer | 56—257 |
| 3,137,984 | 6/1964 | Shonkwiler | 56—214 |

ABRAHAM G. STONE, *Primary Examiner.*

ANTONIO F. GUIDA, *Examiner.*